(12) United States Patent
Narine et al.

(10) Patent No.: US 10,316,235 B2
(45) Date of Patent: Jun. 11, 2019

(54) FOOD/BEVERAGE CONTAINER WITH THERMAL CONTROL

(71) Applicant: Trent University, Peterborough (CA)

(72) Inventors: Suresh S. Narine, Peterborough (CA); Michael C. Floros, Aurora (CA); Michael Tessier, Toronto (CA)

(73) Assignee: Trent University, Peterborough, Ontario (CA)

( * ) Notice: Subject to any disclaimer, the term of this patent is extended or adjusted under 35 U.S.C. 154(b) by 0 days.

(21) Appl. No.: 14/605,444

(22) Filed: Jan. 26, 2015

(65) Prior Publication Data

US 2016/0215194 A1     Jul. 28, 2016

(51) Int. Cl.
| | |
|---|---|
| *C09K 5/06* | (2006.01) |
| *A47J 41/00* | (2006.01) |
| *A47J 41/02* | (2006.01) |
| *B65D 81/38* | (2006.01) |
| *F28D 20/02* | (2006.01) |

(52) U.S. Cl.
CPC ........... *C09K 5/063* (2013.01); *A47J 41/0044* (2013.01); *A47J 41/02* (2013.01); *B65D 81/3841* (2013.01); *B65D 81/3846* (2013.01); *B65D 81/3869* (2013.01); *B65D 81/3874* (2013.01); *F28D 20/02* (2013.01); *Y02E 60/145* (2013.01)

(58) Field of Classification Search
CPC ........... C11D 3/39; A01N 37/04; B32B 15/02; A01C 1/00; A01C 1/06; C09K 5/02
See application file for complete search history.

(56) References Cited

U.S. PATENT DOCUMENTS

| | | | |
|---|---|---|---|
| 1,721,311 | A | 9/1925 | Muenchen |
| 3,463,140 | A | 8/1969 | Rollor, Jr. |

(Continued)

FOREIGN PATENT DOCUMENTS

| | | |
|---|---|---|
| GB | 2 447 234 | 9/2008 |
| WO | WO 2001/099871 | 8/2011 |

OTHER PUBLICATIONS

Raghunanan et al. "Engineering Green Lubricants I: Optimizing Thermal and Flow Properties fo Linear Diesters Derived from Vegetable oils", ACS Sustainable Chemistry Engineering pp. 686-692. Feb. 2016.*

(Continued)

*Primary Examiner* — Gregory R Delcotto
*Assistant Examiner* — Preeti Kumar
(74) *Attorney, Agent, or Firm* — Bereskin & Parr LLP/S.E.N.C.R.L.; Michael Fenwick

(57) ABSTRACT

A container for a food and/or beverages is provided. The container is designed such that it may have the capability of absorbing excess thermal energy from the food or beverage, thereby cooling the consumable material to a desired temperature and maintaining the material at the desired temperature for a considerable period of time. The container typically includes an outer insulating shell; an inner heat conducting liner and a phase change material (PCM). To facilitate heat transfer to and from a food or beverage stored in the container, the PCM is commonly disposed between the outer insulating shell and the inner heat conducting liner and positioned in thermal contact with the inner heat conducting liner. The PCM may include a diol diester having a melting point of about 30 to 90° C.

36 Claims, 4 Drawing Sheets

(56) References Cited

U.S. PATENT DOCUMENTS

| | | | |
|---|---|---|---|
| 3,603,106 A | 9/1971 | Ryan | |
| 3,766,975 A | 10/1973 | Todd | |
| 4,781,243 A | 11/1988 | DeVogel et al. | |
| 4,782,670 A | 11/1988 | Long et al. | |
| 4,936,377 A | 6/1990 | DeVogel et al. | |
| 4,976,892 A | 12/1990 | Jeromin et al. | |
| 5,271,244 A | 12/1993 | Staggs | |
| 5,501,268 A | 3/1996 | Stovall et al. | |
| 5,648,483 A | 7/1997 | Granberg et al. | |
| 5,884,006 A | 3/1999 | Frohlich et al. | |
| 6,029,457 A | 2/2000 | Neeser et al. | |
| 6,108,489 A | 8/2000 | Frohlich et al. | |
| 6,200,681 B1* | 3/2001 | Jahns | B01J 13/14 428/402.21 |
| 6,209,343 B1 | 4/2001 | Owen | |
| 6,501,057 B1 | 12/2002 | Jarvis | |
| 6,634,417 B1 | 10/2003 | Kolowich | |
| 6,936,791 B1 | 8/2005 | Baldwin et al. | |
| 6,968,888 B2 | 11/2005 | Kolowich | |
| 7,059,387 B2 | 6/2006 | Kolowich | |
| 7,060,301 B2* | 6/2006 | Wei | A01N 37/16 422/29 |
| 7,431,174 B2 | 10/2008 | Thissen | |
| 7,836,722 B2 | 11/2010 | Magill et al. | |
| 7,934,537 B2 | 5/2011 | Kolowich | |
| 8,205,468 B2 | 6/2012 | Hemminger | |
| 8,297,072 B2 | 10/2012 | Willcoxen et al. | |
| 8,741,822 B2* | 6/2014 | Narine | C10M 105/40 508/463 |
| 9,035,222 B2 | 5/2015 | Alexander | |
| 9,181,015 B2 | 11/2015 | Booska | |
| 2005/0250669 A1* | 11/2005 | Queen | A61K 8/42 510/501 |
| 2006/0032605 A1 | 2/2006 | Kolowich | |
| 2006/0156756 A1 | 7/2006 | Becke | |
| 2006/0233986 A1 | 10/2006 | Gutsche et al. | |
| 2006/0286319 A1 | 12/2006 | Magill et al. | |
| 2007/0000484 A1* | 1/2007 | Magill | C09K 5/063 126/263.02 |
| 2007/0261431 A1 | 11/2007 | Cohen et al. | |
| 2008/0087674 A1 | 4/2008 | Overgaard | |
| 2009/0227451 A1* | 9/2009 | Rose | A01C 1/06 504/100 |
| 2010/0012883 A1* | 1/2010 | Hartmann | C08F 8/14 252/70 |
| 2010/0108694 A1 | 5/2010 | Sedlbauer et al. | |
| 2011/0121246 A1* | 5/2011 | Biggin | C04B 28/32 252/601 |
| 2011/0124769 A1 | 5/2011 | Moen et al. | |
| 2011/0155621 A1 | 6/2011 | Lindquist et al. | |
| 2011/0233219 A1 | 9/2011 | Proskey | |
| 2012/0259087 A1* | 10/2012 | Cramail | C07D 317/36 528/229 |
| 2012/0260656 A1 | 10/2012 | Tseng et al. | |
| 2012/0283467 A1* | 11/2012 | Cramail | C07C 323/52 560/154 |
| 2013/0056175 A1 | 3/2013 | Hidalgo et al. | |
| 2013/0255824 A1 | 10/2013 | Williams et al. | |
| 2014/0026595 A1* | 1/2014 | Pause | F25D 5/02 62/4 |
| 2014/0242127 A1* | 8/2014 | Yokozeki | A61Q 1/02 424/401 |
| 2015/0052933 A1 | 2/2015 | Darrow | |
| 2015/0197678 A1* | 7/2015 | Han | C09K 5/063 252/73 |
| 2016/0309932 A1* | 10/2016 | Sedlbauer et al. | A47J 41/00 |
| 2017/0042373 A1 | 2/2017 | Alexander et al. | |

OTHER PUBLICATIONS

Materials Letters vol. 137, Dec. 15, 2014, pp. 252-255 Floros et al. "Saturated linear diesters from stearic acid as renewable phase change materials" Materials Letters vol. 137 (2014) p. 252-255.*

Sharma et al. (Phase Change Materials for Low Temperature Solar Thermal Applications) Res. Rep. Fac. Eng. Mie Univ, vol. 29, pp. 31-64 (2004) specifically table 3 on p. 36 and table 5 on p. 38 meet the instant PCM and p. 49 bottom paragraph provides nexus to food grade container.*

Carbowax,MSDS. pp. 1-2, 2011.*

Stearic acid MSDS, 4pp. 2006.*

Cabus, et al., Monotropic Polymorphism in Ester-Based Phase Change Materials from Fatty Acids and 1,4-Butanediol, Crystal Growth & Design, Jun. 2013, vol. 13, No. 8, pp. 3438-3446.

International Search Report and Written Opinion for PCT Application No. PCT/IB2016/050176, dated Apr. 15, 2016, 8 pages.

Abes et al., Crystallization and phase behavior of fatty acid esters of 1,3-propanediol I: Pure systems, Chemistry and Physics of Lipids, vol. 149, 2007, pp. 14-27.

Abes et al., Crystallization and phase behavior of 1,3-propanediol esters II. 1,3-Propanediol distearate/1,3-propanediol diplamitate (SS/PP) and 1,3-propanediol distearate/1,3-propanediol dimyristate (SS/MM) binary systems, Chemistry and Physics of Lipids, vol. 150, 2007, pp. 89-108.

Abes et al., Crystallization and phase behavior of fatty acide esters of 1,3 propanediol III: 1,3 propanediol dicaprylate/1,3 propanediol distearate (CC/SS) and 1,3 propanediol dicaprylate/1,3 propanediol dipalmitate (CC/PP) binary systems, Chemistry and Physics of Lipids, vol. 151, 2008, pp. 110-124.

Alkan et al., Preparation and thermal properties of ethylene glycol distearate as a novel phase change material for energy storage, Materials Letters, vol. 62, 2008, pp. 1122-1125.

Ataya et al., Acid-catalyzed transesterification of canola oil to biodiesel under single- and two-phase reaction conditions, Energy & Fuels 21(4), 2007, pp. 2450-2459.

Aydin, A. A., Fatty acid ester-based commercial products as potential new phase change materials (PCMs) for thermal energy storage, Solar Energy Materials and Solar Cells, vol. 108, 2013, pp. 98-104.

Cabeza et al., Materials used as PCM in thermal energy storage buildings: a review, Renewable and Sustainable Energy Reviews 15(3), 2011, pp. 1675-1695.

Farid et al., A review on phase change energy storage: materials and applications, Energy conversion and management 45(9), 2004, pp. 1597-1615.

Feldman et al., Low chain esters of stearic acid as phase change materials for thermal energy storage in buildings, Solar Energy Materials and Solar Cells 36(3), 1995, pp. 311-322.

Flores et al., Saturated linear diesters from stearic acid as renewable phase change materials, Materials Letters, vol. 137, 2014, pp. 252-255.

Hasnain, S. M., Review on sustainable thermal energy storage technologies, Part I: Heat storage materials and techniques, Energy Conversion and Management 39(11), 1998, pp. 1127-1138.

He et al., Technical grade paraffin waxes as phase change materials for cool thermal storage and cool storage systems capital cost estimation, Energy Conversion and Management 43(13), 2002, pp. 1709-1723.

Hoshi et al., Screening of high melting point phase change materials (PCM) in solar thermal concentrating technology based on CLFR, Solar Energy 79(3), 2005, pp. 332-339.

Khudhair et al., A review on energy conservation in building applications with thermal storage by latent heat using phase change materials, Energy Conversion and Management 45(2), 2004, pp. 263-275.

Li et al., Preparation and characterization of a novel solid-liquid PCM: Butanediol di-stearate, Materials Letters, vol. 61, 2007, pp. 1526-1528.

Li et al., Preparation and characterization of a series of diol di-stearates as phase change heat storage materials, Materials Letters, vol. 61, 2007, pp. 4325-4328.

Noureddini, Glycerolysis of Fats and Methyl Esters, JAOCS 74(4), 1997, 8 pages.

Noureddini et al, Kinetics of Transesterification of Soybean Oil, JAOCS 74(11), pp. 1457-1463.

Sarier et al., The manufacture of microencapsulated phase change materials suitable for the design of thermally enhanced fabrics, Thermochimica Acta 452(2), 2007, pp. 149-160.

(56) References Cited

OTHER PUBLICATIONS

Sarier et al., Organic phase change materials and their textile applications: An overview, Thermochimica Acta, vol. 540, 2012, pp. 7-60.
Sonntag, N., Glycerolysis of Fats and Methyl Esters-Status, Review and Critique, JAOCS 59(10), 1982, pp. 795A-802A.
Von Wilhelm Schlenk jr., Melting Points in Homologous Series of Long-Chain Compounds, Justus Liebigs Annalen der Chemie, vol. 727, 1969, pp. 1-9.

\* cited by examiner

FOOD/BEVERAGE CONTAINER WITH THERMAL CONTROL

BACKGROUND

Numerous applications for phase change energy storage materials exist where excess thermal energy is lost due to an inability to store it, or where removal of this heat is desired. Examples include the regulation of food temperatures during transport or storage to prevent spoilage or maintain a desired temperature. Phase change materials (PCMs) can be used to store and release thermal energies through phase transformations—most commonly melting and crystallization. The energy which is stored and released in these transitions is known as latent heat, and latent heat storage is among the most effective techniques for storing and/or regulating thermal energy. By selecting a PCM possessing a phase change at the desired temperature and with the required enthalpy of phase change, thermal fluctuations can be regulated.

Different temperature ranges between the classes of PCMs generally dictates which type of PCM will be suitable for a specific application. PCMs are most often divided into classifications based on their chemical composition. Inorganic PCMs such as hydrated and molten salts are used for high temperature applications, while organic PCMs such as fatty acids and paraffin waxes are used at lower temperatures. Paraffin waxes, which consist of a series of linear and branched saturated hydrocarbon molecules which are solid at room temperature, are one of the most widely used PCMs. Paraffin waxes are formulated based on different boiling fractions from petrochemical refineries, and a single fraction generally contains multiple isomers and alkane chain lengths. The melting point of a paraffin wax is dependent on the number of carbon atoms in the paraffin, and it generally increases with the average carbon number.

Due to the environmental implications and increasing economic costs associated with limited oil reserves and corresponding increasing costs associated with petrochemicals, renewable alternatives for paraffin wax are attracting significant attention. Analysis of the constituents of paraffin waxes in candles shows that such materials often contain hazardous components, such as toluene, trichloroethylene and/or a variety of alkanes and alkenes, many of which have unknown safety implications. Due to these toxicity issues and the non-renewability of the feedstock, interest in renewable PCMs from fatty acids and fatty acid esters has been growing. Fatty acids are suitable candidates for the substitution of paraffin wax in many applications—they may be non-toxic, are renewable. The fatty acid derived PCMs produced to date typically have melting temperature and latent heat values lower than those of paraffin wax, resulting in lower energy storage densities. Blends of fatty esters with varying melting points and latent heat values between 110-140 J/g has been reported. Although the PCMs that were produced are renewable, the melting points and latent heat values compare unfavorably with those of paraffins.

SUMMARY

The present application is directed to containers for a food and/or beverage (consumable material). The containers are designed such that they may act as a thermal 'sponge', with the capability of absorbing excess thermal energy from a food or beverage, thereby cooling the consumable material to a desired temperature and maintaining the material at the desired temperature for a considerable period of time. If the food or beverage begins to cool below the desired temperature, the present containers may release thermal energy back to the food/beverage, thereby maintaining the desired temperature.

The present containers typically include an outer insulating shell; an inner heat conducting liner and a phase change material (PCM), which is disposed between the outer insulating shell and the inner heat conducting liner. The PCM is generally positioned in thermal contact with the inner heat conducting liner, to facilitate heat transfer to and from a food or beverage stored in the container. For example, the present container may be a beverage container, such as a vacuum insulated coffee cup, designed to maintain a hot beverage at an "ideal drinking temperature" of about 50 to 70° C.

In another embodiment, the present food or beverage container includes a bottom wall and side walls, which may be part of an inner liner. At least a portion of the bottom wall and/or side walls adjacent the inside compartment of the container includes phase change material distributed within at least the inside portion of the wall. The container may also include an outer insulating shell surrounding all or a portion of the inner liner. The phase change material may be distributed within a matrix (e.g., distributed within a polymeric matrix) which makes up a portion of the bottom and/or side wall. The inner liner may include a heat conducting material on the inner surface which is in contact with food or beverage placed within the container. In such embodiments, the phase change material is often in encapsulated form, e.g., encapsulated in a polymeric or metallic shell. In some instances, at least some inner portions of the bottom wall and/or side walls may include a coating formed of a plurality of microcapsules containing the phase change material distributed within a matrix material.

The present containers may desirably include a PCM having a melting point of about 30 to 90° C. (and commonly about 50 to 70° C.). Such PCMs may include a diol diester having an appropriate melting point and desirably, a latent heat enthalpy of at least about 230 kJ/kg. The diol diester may be a material represented by a formula

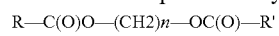

wherein the R—C(O)O— and R'—C(O)O— groups are fatty acid acyl groups. The R- and R'-groups commonly independently have from 5 to 30 carbon atoms; and n may be an integer from 2 to 22. In some instances, the fatty acid acyl groups include one or more saturated fatty acyl groups, e.g. a stearate and/or palmitate group. In other instances, the fatty acid acyl groups include one or more unsaturated fatty acyl groups, e.g. an oleate group. In some instances, the fatty acid acyl groups are fatty acyl groups corresponding to the fatty acid composition of a vegetable oil or fraction thereof. In other instances, the fatty acid acyl groups are fatty acyl groups corresponding to a fatty acid composition of a hydrogenated vegetable oil (e.g., a partially or completely hydrogenated vegetable oil) or fraction thereof.

In one embodiment, a beverage container includes a PCM designed to act as a thermal 'sponge', absorbing the excess thermal energy from the beverage and rapidly cooling the beverage to the melting point of the PCM as the PCM undergoes melting, thereby allowing safe consumption of the beverage in a short period of time. As the beverage begins to cool below the melting temperature of the PCM, the PCM crystallizes, releasing the thermal energy 'stored' in its liquid state back to the beverage, thereby maintaining the beverage at its desired temperature (roughly the melting point of the PCM).

DETAILED DESCRIPTION

The present containers commonly include a phase change material (PCM) disposed between an outer insulating shell and an inner heat conducting liner of the container. The PCM may be placed in thermal contact with the inner heat conducting liner. The outer insulating shell and the inner heat conducting liner may form a hollow chamber that extends adjacent the bottom wall and/or side walls of the inner container. The hollow chamber is typically filled with a phase change material that stays cold for an extended period of time when chilled, or stays hot for an extended period of time when heated. In many embodiments, the phase change material substantially fills the hollow chamber adjacent the bottom wall and/or side walls of the container. The inner container may be removably assembled into the outer container. Surface contact between the bottom wall and/or side walls of the inner container transfers the cold/heat of the phase change material to or from a food or beverage contained in the inner container.

Figure 3:
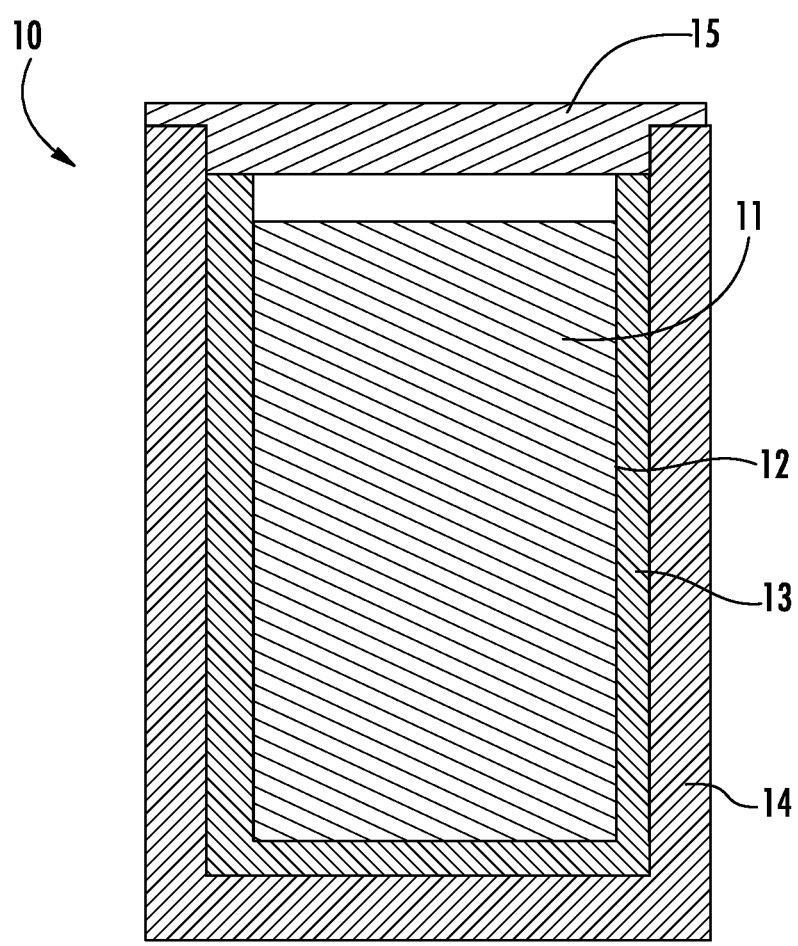
FIG. 3 shows schematic representation of a hot beverage container including a PCM ("liquid PCM") capable of being used for thermal regulation of a hot beverage.

FIG. 3 shows schematic representation of one embodiment of a hot beverage container 10. The beverage container 10 includes an outer insulating shell 14, which includes an evacuated chamber ("vacuum chamber"), to enhance the insulating properties of the outer insulating shell 14. An inner heat conducting liner 12 is positioned inside the outer insulating shell 14. The beverage container 10 also includes a phase change material ("liquid PCM") 13 disposed between the outer insulating shell 14 and the inner liner 12. The examples shown also includes a lid 15 covering the top of the container 10. The internal chamber 11 defined by the inner heat conducting liner 12 may be filled with a hot beverage, such as coffee.

The properties of the present diol diester PCMs may offer significant advantages to similar PCMs on the market, e.g., in terms of the latent heat values, as well as the range spanned by their melting points. The latent heats of the present diol diester materials are typically much higher than the comparable bio-derived PCMs stearic acid and palmitic acid, which have latent heat values ranging from 155-199 J/g. Furthermore, the latent heat values may be higher than commercial paraffin waxes commonly used in such applications (reported to range from 146-210 J/g). The present diol diesters exhibit melting points which span a temperature range of at least about 35 to 80° C. and thus have the versatility to cover a higher range than palmitic acid or stearic acid, which respectively melt at 63° C. and 69° C. Since the present diol diesters are derived from renewable sources, possess higher latent heats and are synthesized from entirely non-toxic materials, their substitution for paraffin waxes can be advantageous in a large variety of applications.

The PCM used to form the present containers may have a melting point of about 30 to 90° C. For example, hot beverage containers may have a PCM with a melting point of about 50 to 70° C. The PCMs employed in the present containers may include a diol diester represented by a formula

wherein the R—C(O)O— and R'—C(O)O— groups are fatty acid acyl groups and the R- and R'-groups independently have from 5 to 30 carbon atoms (commonly about 10 to 18); and n is an integer from 2 to 22 (commonly about 2 to 15). The diol diester may include fatty acid acyl groups corresponding to the fatty acid composition of a fatty acid ester material, such as a natural triacylglyceride material (e.g., tallow or a vegetable oil) or fraction thereof.

In some embodiments, the fatty acid acyl groups (also referred to herein as "fatty acyl groups") in the PCM are a C6-C22 saturated and/or unsaturated fatty acid. In some embodiments, the fatty acyl groups are a C10-C18 saturated and/or unsaturated fatty acid. In some instances, the fatty acyl groups may be a C16 and/or C18 fatty acyl group while n is 2, 3 and/or 4. In other embodiments, the fatty acyl groups may be a C18 acyl group (e.g., a stearate and/or oleate group) and n is 5, 7 and/or 9. In other embodiments, the fatty acyl groups may be a C18 acyl group and n is 2. In other embodiments, the fatty acyl groups may be a C18 acyl group and n is 4. In other embodiments, the fatty acyl groups may be a C16 acyl group (e.g., a palmitate group) and n is 4. In some embodiments, the fatty acyl groups may be a C16 acyl group and n is 2.

In some embodiments, the fatty acyl groups include one or more saturated fatty acyl groups. In some embodiments, the fatty acyl groups may include one or more unsaturated fatty acyl groups. In some instances, the fatty acyl groups correspond to the fatty acid the fatty acid composition of a vegetable oil or fraction thereof. For example, the vegetable oil may include soybean oil, palm oil, corn oil, cottonseed oil, sunflower oil, canola oil and/or coconut oil. In some embodiments, the fatty acyl groups acyl group may correspond to the fatty acid composition of a hydrogenated (either partially or completely hydrogenated) vegetable oil or fraction thereof.

The mixture of fatty acids isolated from complete hydrolysis of a fatty acid ester material, such as a triacylglyceride material (e.g., a vegetable oil, tallow or a fraction thereof), in a specific sample are referred herein to as the "fatty acid composition" of that sample. By the term "fatty acid composition" reference is made to the identifiable fatty acid residues in the various esters. The distribution of fatty acids in a particular triacylglyceride oil or other fatty ester mixture may be readily determined by methods well known to those skilled in the art, e.g., via gas chromatography or complete conversion to a mixture of fatty acid methyl esters followed by analysis by gas chromatography.

In some embodiments, the fatty acyl groups are stearate groups. Such PCMs may include a diol diester, which has a peak melting point of at least about 60° C. and/or a latent heat enthalpy of at least about 230 kJ/kg.

In some embodiments, the fatty acyl groups are palmitate groups. Such PCMs may include a diol diester, which has a peak melting point of at least about 55° C. and/or a latent heat enthalpy of at least about 230 kJ/kg.

The value of the integer n and correspondingly the properties of the resulting diol diester can be modulated by using alkane diols of varying chain length. In some embodiments, n is an integer from 2 to 22, from 2 to 20, from 2 to 15, from 2 to 12, from 2 to 10 or from 2 to 4. In some embodiments, n may be an odd number. In other embodiments, n may desirably be an even number (e.g., 2, 4, 6 or 8). In some embodiments, n may be 2. In many instances, embodiments where n is 2, 3 and/or 4, i.e., the diol is ethanediol, 1,3-propanediol and/or 1,4-butanediol maybe advantageously employed.

In some embodiments, n is an odd number, and the diol diester has a latent heat enthalpy of at least about 230 kJ/kg, or even a latent heat enthalpy about 250 kJ/kg or higher. In such embodiments, n may be 5, 7, 9 and/or 11.

In many embodiments, it may be advantageous to employ a PCM which is quite pure and includes a relatively high percentage of the diol diester. The PCM typically includes at least about 90 wt. % of the diol diester and may include, at least about 92 wt. %, at least about 95 wt. %, at least about 96 wt. %, at least about 98 wt. %, or at least about 99 wt. %, of the diol diester. It has been found that the patent heat enthalpy of highly pure samples of the diol diester have substantially higher latent heat enthalpies than previously reported for such compounds. The diol diester may have a latent heat enthalpy of at least about 225 kJ/kg. More commonly, the present PCM has a latent heat enthalpy of at least about 230 kJ/kg, at least about 240 kJ/kg, or at least about 250 kJ/kg. In some embodiments, the PCM includes at least about 98 wt. % of the diol diester, which has a latent heat enthalpy of at least about 230 kJ/kg. In such embodiments, diol diester may have a latent heat enthalpy of at least about 240 kJ/kg.

In many embodiments, the PCM has a latent heat enthalpy of at least about 200 kJ/kg. PCM has a latent heat enthalpy of at least about 200 kJ/kg. More commonly, the present PCM has a latent heat enthalpy of at least about 225 kJ/kg, at least about 230 kJ/kg, at least about 240 kJ/kg, or at least about 250 kJ/kg. In some embodiments, the PCM includes at least about 98 wt. % of the diol diester and has a latent heat enthalpy of at least about 230 kJ/kg.

In some embodiments, the purity of the diol diester may be determined by derivative thermogravimetric analysis. Advantageously, the PCM includes a diol diester, for which derivative thermogravimetric analysis demonstrates that the diol diester does not exhibit a thermal degradation peak below 300° C. It has been found that the presence of impurities characterized by a thermal degradation peak below 300° C. in a particular sample of a diol diester can lead to substantially lowering of the latent heat enthalpy of such a material.

The diol diester, which can be employed as PCMs in the present food/beverage containers, may be produced by reacting a fatty acid alkyl ester, such as a fatty acid methyl ester, with an alkanediol, typically an α,ω-alkanediol, in the presence of a transesterification catalyst. The reaction is typically conducted in the absence of a solvent. If the reactants are present is a mole ratio of at least about 2:1 (fatty acid methyl ester/diol), high yields of the desired diol diester product may be obtained. The reaction is typically conducted at reaction temperatures of about 90 to 150° C. The method commonly includes removing the alkanol (e.g., methanol where the starting reactant is a methyl ester) generated as a side product from the reaction mixture. This may be done in a continuous manner, optionally with the aid of vacuum.

Due to the non-toxic components and the wide range of phase change temperatures, the diol diester PCMs can be safely used for food and beverage related applications. For example, the containers described herein may be used in storing or transporting hot or cold food or beverages, regulating temperature in beverages and cooling or heating of food to an optimal temperature.

PCM Modified Vacuum Mug

Figure 1:
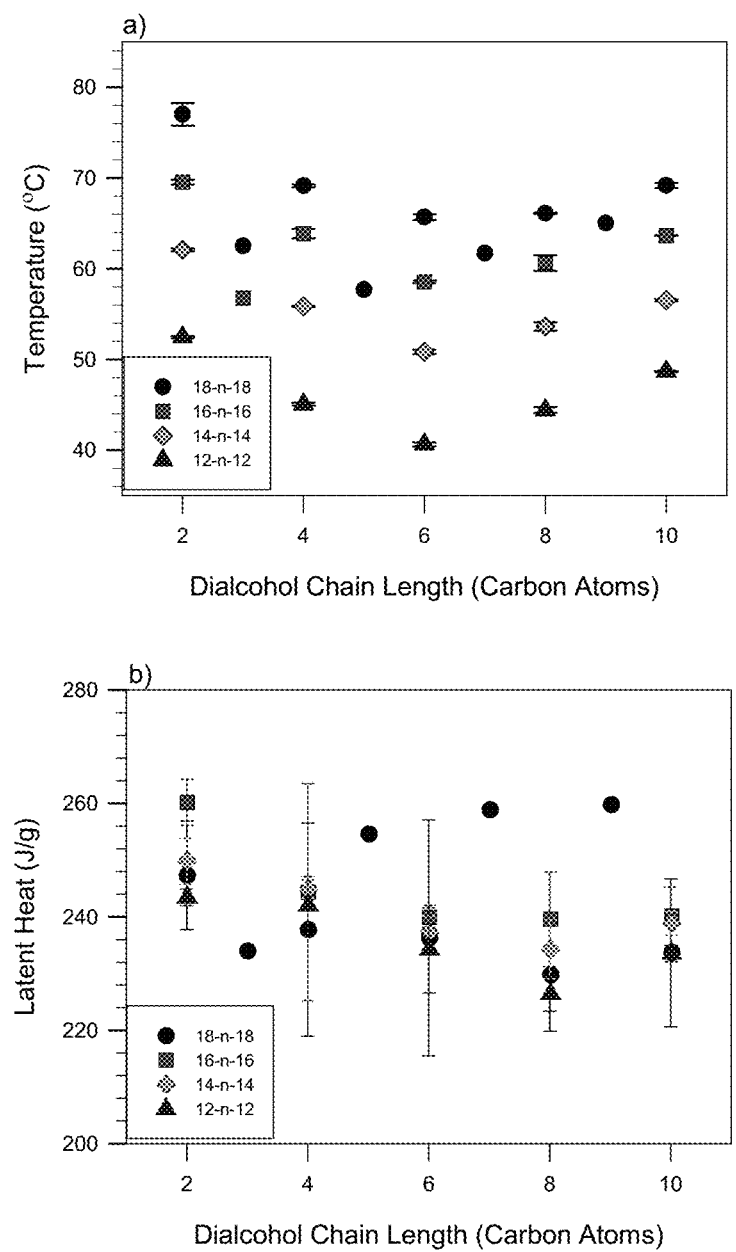
FIG. 1 shows graphs depicting 1(a) peak melting point of a series of diol diesters of even carbon length saturated fatty acids and 1(b) latent heat values for the same series of diol diesters. All values are single replicates except for the 18-n-18 series, which shows the average values, where the error bars represent standard deviations from duplicates or triplicates.
Figure 2:
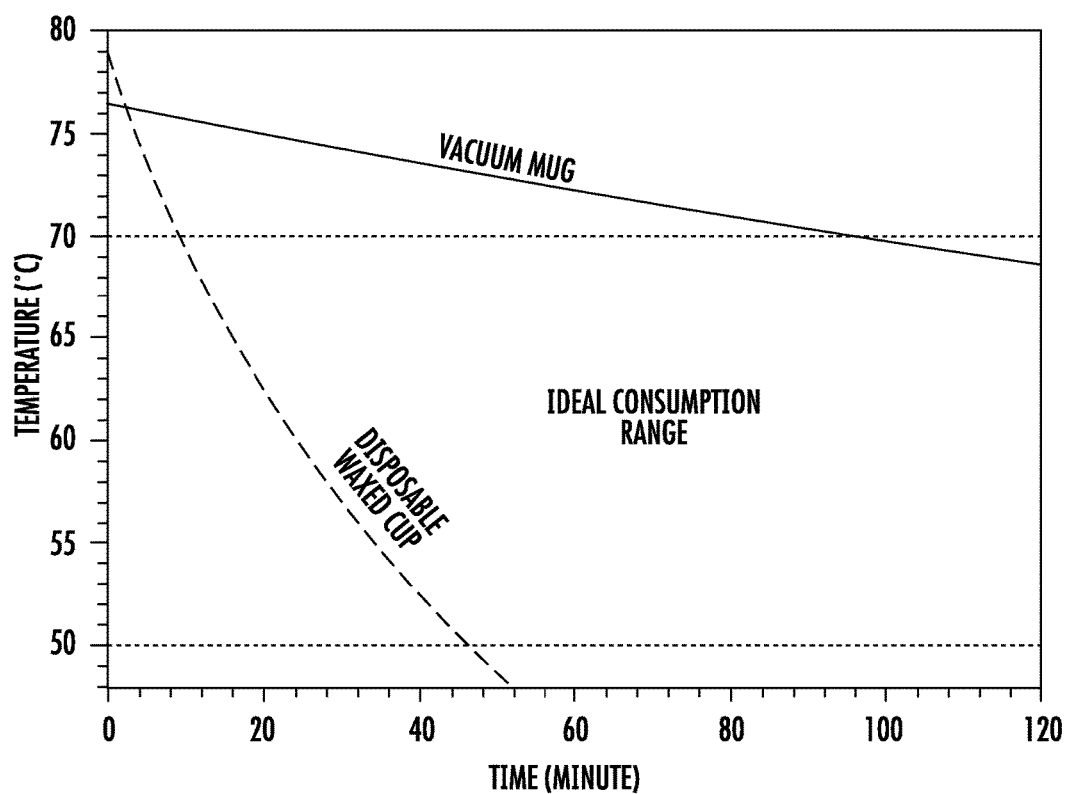
FIG. 2 is a graph illustrating temperature vs time comparison for a hot beverage in a waxed paper cup and a vacuum mug.

To demonstrate the utility of the present diol diester PCMs for food and beverage applications, a test to regulate the temperature of a hot beverage in a controlled environment was conducted. The processes behind brewing coffee and tea involve the extraction of sparingly water soluble compounds from the coffee bean or tea leaves. Hot water is required for adequate extraction to produce the desirable flavor. However, the ideal drinking temperature for coffee is around 60±10° C., or a range approximately between 50-70° C. The typical dispensing temperature of coffee in commercial establishments is >80° C. Furthermore, the two most common containers for serving hot beverages at commercial establishments are disposable waxed paper cups or reusable vacuum beverage mugs. Both of these offerings have shortfalls in either the amount of time it takes for coffee to reach a safe drinking temperature (circa 70° C.), and the amount of time the beverage remains hot enough to be enjoyed at an ideal drinking temperature (≥about 50° C.). To illustrate this, a large waxed paper cup was compared with a stainless steel vacuum insulated coffee cup (Planetary Design, Missoula, Mont., USA). The waxed paper cup quickly loses its heat, while the beverage in the vacuum insulated mug remains dangerously hot and above the ideal drinking temperature for more than 90 minutes (FIG. 2).

To improve the thermal profile of the vacuum coffee mug, a 500 ml cylindrical stainless steel drinking bottle (Presidents Choice, Brampton, Ontario, Canada) was cut to a height so that when placed inside the Planetary Design vacuum mug, the lid could still close. The bottle allowed a void of approximately 50 ml between the wall of the vacuum mug and the outer wall of the drinking bottle. The diol diester PCM 16-4-16 (which was synthesized from methyl palmitate and 1,4-butanediol) had a melting peak at 63° C., which is in the middle of the range for the ideal consumption of a hot beverage. Into the void between the vacuum mug and the water bottle (in the modified Planetary Design vacuum mug), 30 g of the PCM 16-4-16 (which was synthesized from methyl palmitate and 1,4-butanediol) was poured while melted, and allowed to rapidly crystallize. The diol diester PCM 16-4-16 (which was synthesized from methyl palmitate and 1,4-butanediol) had a melting peak at 63° C., which is in the middle of the range for the ideal consumption of a hot beverage. The top of the cup insert was fixed to the wall of the vacuum mug using a silicone adhesive sealant (DAP® All-Purpose 100% Silicone Adhesive Sealant (Baltimore, Md., USA) so that the PCM and remaining void space was effectively sealed off from the outside (see, e.g., FIG. 3).

Figure 4:
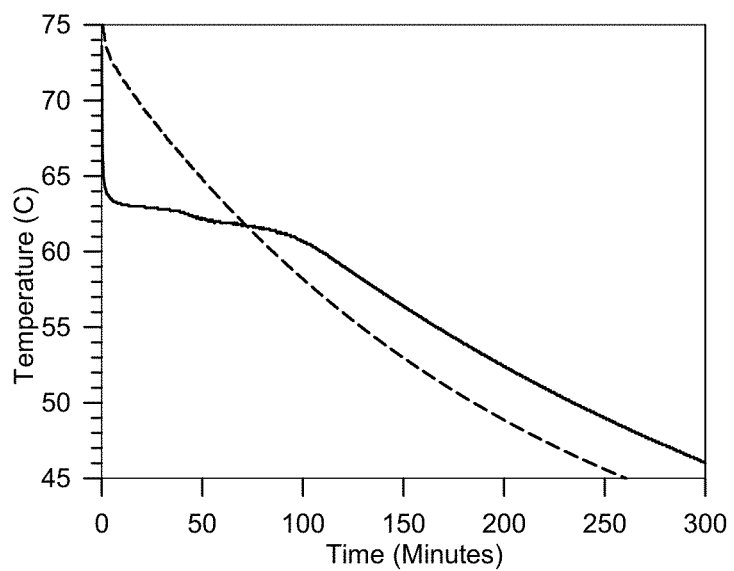
FIG. 4 is a graph illustrating the temperature vs time comparison for 250 mL water introduced an initial temperature of 85° C. into an unmodified vacuum mug (dashed line), and into the same mug with 30 g of 16-4-16 diol diester in thermal contact with the hot water (solid line).

The PCM material added to the void space of the vacuum mug was designed to act as a thermal 'sponge', absorbing the excess thermal energy from the beverage and rapidly cooling it to the melting point of the PCM as the PCM undergoes melting, thereby allowing safe consumption of the beverage in much less time. As the beverage begins to cool below the melting temperature of the PCM, the PCM crystallizes, releasing the thermal energy 'stored' in its liquid state back to the beverage thereby maintaining the beverage at its desired temperature (e.g., within the desired temperature range) for a longer period of time. FIG. 4 illustrates this effect and shows the results of the modified vacuum mug compared to the unmodified control.

As shown in FIG. 4, the hot beverage was cooled from 85° C. to within the ideal range (~65° C.) in less than one minute, and remained above 50° C. for 3 hours and 55 minutes. Meanwhile, the control mug without PCM took 14 minutes to reach the drinkable range (<70° C.), and only remained in the ideal range (>50° C.) for 2 hours and 38 minutes—a reduction of 1 hour and 17 minutes. This experiment demonstrates the potential of the present diol diester PCM material for both the regulation and maintenance of a food or beverage within a specific temperature or temperature range without requiring any external input of energy.

Illustrative Embodiments

The following exemplary embodiments are presented to illustrate the present polymer-based composite materials, coatings and methods to assist one of ordinary skill in making and using the same. These illustrative embodiments are not intended in any way to otherwise limit the scope of the invention described herein.

In one embodiment, a food/beverage container comprising an outer insulating shell and an inner heat conducting liner is provided. The container includes a phase change material (PCM) disposed between the outer insulating shell and the inner heat conducting liner, such that the PCM is in thermal contact with the inner heat conducting liner. The outer insulating shell of the container may include an evacuated chamber ("vacuum chamber"). The inner heat conducting liner is typically formed from a metal but may be formed from any suitable heat conducting material. In some instances, the phase change material may be encapsulated, e.g., encapsulated in a polymer shell or encapsulated in a metallic shell. In some embodiments, it may be advantageous to disperse the phase change material in a heat transfer fluid. The PCM commonly has a melting point of about 30 to 90° C. and in some embodiments, e.g., where the container is designed to be used to store and/or dispense hot food or a hot beverage, the PCM may advantageously have a melting point of about 50 to 70° C. The PCM may have a latent heat enthalpy of at least about 230 kJ/kg, at least about 240 kJ/kg, or even at least about 250 kJ/kg. In some embodiments, the PCM includes at least about 98 wt. % or even at least about 99 wt. % of the diol diester. As discussed herein, it may be particularly desirable to use a diol diester having a relatively high degree of purity. For example, it may be advantageous to employ a diol diester, for which derivative thermogravimetric analysis does not exhibit a thermal degradation peak below 300° C. Various embodiments of the container may employ any of the diol diesters described herein.

The PCM may include a diol diester represented by the formula

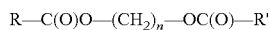

wherein the R—C(O)O— and R'—C(O)O— groups are fatty acid acyl groups and the R- and R'-groups independently have from 5 to 30 carbon atoms, typically 8 to 22 carbon atoms and n is an integer from 2 to 22, typically from 2 to 15. The fatty acid acyl groups comprise one or more saturated fatty acyl groups, e.g., stearate and/or palmitate groups. In some instances, the fatty acid acyl groups comprise one or more unsaturated fatty acyl groups e.g., oleate groups. The diol diester commonly has a melting point of about 30 to 90° C. and, in many instances, about 50 to 70° C. In some aspects, the PCM consists essentially of and may consist solely of diol diesters in which n is an odd number (e.g., n is 5, 7, 9 or 11) and the diol diester has a latent heat enthalpy of at least about 240 kJ/kg. In such instances, the fatty acid acyl groups are often stearate groups.

The PCM may include a diol diester wherein the fatty acid acyl groups are fatty acyl groups from a fatty acid composition of a vegetable oil or fraction thereof. For example, the vegetable oil may be soybean oil, palm oil, corn oil, cottonseed oil, sunflower oil, canola oil and/or coconut oil. Diol diesters where the fatty acid acyl groups are fatty acyl groups from a fatty acid composition of other triglyceride oils, such as tallow, or a fraction thereof may also be employed. In some instances, it may be advantageous to employ a diol diester wherein the fatty acid acyl groups are fatty acyl groups from a fatty acid composition of a hydrogenated triglyceride oils, vegetable oil or fraction thereof. The hydrogenated triglyceride oil may be partially or completely hydrogenated. Suitable examples of a hydrogenated triglyceride oil include hydrogenated tallow and hydrogenated vegetable oils, such as hydrogenated soybean oil, hydrogenated palm oil, hydrogenated corn oil, hydrogenated cottonseed oil, hydrogenated canola oil and/or hydrogenated coconut oil.

The diol diester may include a compound represented by the formula

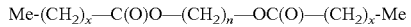

wherein x is an integer from 4 to 30 carbon atoms, commonly 8 to 16 carbon atoms; and n is an integer from 2 to 22, commonly 2 to 15. In some embodiments, the diol diester may consist essentially of a compound represented by this formula. In other embodiments, the diol diester may consist solely of a compound represented by this formula. The diol diester may have fatty acid acyl groups which include stearate groups (x is 16). Such diol diesters may have a peak melting point of at least about 60° C. and a latent heat enthalpy of at least about 225 kJ/kg. In some aspects, the PCM consists of diol diesters wherein x is 14 and/or 16, and n is 2, 3 and/or 4. In some aspects, the PCM consists of diol diesters wherein x is 14 and/or 16, and n is 2. In some aspects, the PCM consists essentially of and may consist solely of diol diesters wherein x is 16 and n is 5, 7 or 9. In other instances, the PCM consists essentially of and may consist solely of a diol diester in which x is 16 and n is 2 (a "18-2-18 diol diester"). In other instances, the PCM consists essentially of and may consist solely of a diol diester in which x is 16 and n is 4 (a "18-4-18 diol diester"). In other instances, the PCM consists essentially of and may consist solely of a diol diester in which x is 14 and n is 2 (a "16-2-16 diol diester"). In other instances, the PCM consists essentially of and may consist solely of a diol diester in which x is 14 and n is 4. (a "16-4-16 diol diester").

What is claimed is:

1. A food/beverage container comprising an outer insulating shell; an inner heat conducting liner and a phase change material (PCM) disposed between the outer insulating shell and the inner heat conducting liner; wherein the PCM is in thermal contact with the inner heat conducting liner; and the PCM has a melting point of about 30 to 90° C. and comprises a diol diester represented by a formula I

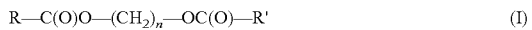

wherein the R—C(O)O— and R'—C(O)O—groups are fatty acid acyl groups and the R- and R'-groups independently have from 5 to 30 carbon atoms; and n is an integer from 3 to 22;

and the PCM has a latent heat enthalpy of at least about 225 kJ/kg.

2. The container of claim 1 wherein the outer insulating shell comprises a vacuum chamber.

3. The container of claim 1 wherein the phase change material is dispersed in a heat transfer fluid.

4. The container of claim 1 wherein the PCM has a melting point of about 50 to 70° C.

5. The container of claim 1 wherein the PCM has a latent heat enthalpy of at least about 240 kJ/kg.

6. The container of claim 1 wherein the PCM comprises at least about 98 wt. % of the diol diester.

7. The container of claim 1 wherein derivative thermogravimetric analysis of the diol diester does not exhibit a thermal degradation peak below 300° C.

8. The container of claim 1 wherein the fatty acid acyl groups comprise one or more saturated fatty acyl groups.

9. The container of claim 1 wherein the fatty acid acyl groups comprise one or more unsaturated fatty acyl groups.

10. The container of claim 1 wherein the diol diester has a melting point of at least about 60° C.; and the fatty acid acyl groups comprise stearoyl groups.

11. The container of claim 1 wherein at least about 90% of the fatty acid acyl groups are stearate, palmitate and/or oleate groups.

12. A food/beverage container comprising an outer insulating shell; sidewalls comprising an inner hear conducting liner and a phase change material (PCM) disposed between the outer insulating shell and the inner heat conducting liner, such that the PCM is in thermal contact with the inner heat conducting liner; and the PCM has a melting point of about 50 to 90° C. and comprises a diol diester represented by formula (II)

$$\text{Me-(CH}_2)_x\text{—C(O)O—(CH}_2)_n\text{—OC(O)—(CH}_2)_x\text{-Me} \qquad \text{(II)}$$

wherein x is an integer from 4 to 30 carbon atoms; and n is an integer from 3 to 22; wherein the diol diester has a latent heat enthalpy of at least about 230 kJ/kg; and the outer insilating shell comprises a vacuum chamber.

13. The container of claim 12 wherein x is an integer from 8 to 16 carbon atoms; and n is an integer from 3 to 15.

14. The container of claim 12 wherein x is 14 and n is 3 and/or 4.

15. The container of claim 12 wherein x is 14.

16. The container of claim 12 wherein x is 16 and n is 5, 7 or 9.

17. The container of claim 12 wherein the fatty acid acyl groups are stearate groups; and the PCM has a peak melting point of at least about 60° C. and a latent heat enthalpy of at least about 225 kJ/kg.

18. The container of claim 12 wherein n is 5, 7, 9 or 11; and the diol diester has a latent heat enthalpy of at least about 240 kJ/kg.

19. The container of claim 1 wherein the fatty acid acyl groups are fatty acyl groups from a fatty acid composition of a vegetable oil or fraction thereof.

20. The container of claim 1 wherein the fatty acid acyl groups are fatty acyl groups from a fatty acid composition of a hydrogenated vegetable oil or fraction thereof.

21. The container of claim 12 wherein x is 16.

22. The container of claim 12 wherein x is 16 and n is 3 or 4.

23. The container of claim 12 wherein x is 12.

24. The container of claim 12 wherein x is 16 and n is 5.

25. The container of claim 12 wherein x is 16 and n is 7.

26. The container of claim 12 wherein x is 16 and n is 9.

27. A food/beverage container comprising an outer insulating shell, which comprises a vacuum chamber; side walls including an inner heat conducting liner adjacent the inside compartment of the container and a phase change material (PCM) disposed between the outer insulating shell and the inner heat conducting liner; wherein the PCM is in thermal contact with the inner heat conducting liner; and the PCM comprises at least about 98 wt % of a diol diester represented by a formula $$\text{R—C(O)O—(CH}_2)_n\text{—OC(O)—R'}$$

wherein the R—C(O)O and R'—C(O)O— groups are fatty acid acyl groups, which have 16 or 18 carbon atoms; and n is an integer from 3 to 10;

the diol diester has a melting point of about 50 to 70° C. and a latent heat enthalpy of at least about 230 kJ/kg; and derivative thermogravimetric analysis of the diol diester does not exhibit a thermal degradation peak below 300° C.

28. The container of claim 27 wherein the R- and R'-groups are palmitate groups.

29. The container of claim 27 wherein the R- and R'-groups are stearate groups.

30. A food/beverage container comprising an outer insulating shell, which comprises a vacuum chamber; side walls including an inner heat conducting liner adjacent an inside compartment of the container; and a phase change material (PCM) disposed between the outer insulating shell and the inner heat conducting liner such that the PCM is in thermal contact with the inner heat conducting liner; the PCM comprises at least about 98 wt % of a diol diester represented by a formula $$\text{R—C(O)O—(CH}_2)_n\text{—OC(O)—R'}$$

wherein the R—C(O)O and R'—C(O)O— groups are fatty acid acyl groups having 8 to 18 carbon atoms; and n is an integer from 3 to 15; the diol diester has a melting point of about 50 to 90° C. and a latent heat enthalpy of at least about 225 kJ/kg.

31. The container of claim 30 wherein n is 5, 7 or 9.

32. The container of claim 30 wherein the diol diester has a latent heat enthalpy of at least about 240 kJ/kg; and the fatty acid acyl groups include stearate groups.

33. The container of claim 30 wherein the phase change material is dispersed in a heat transfer fluid.

34. The container of claim 30 wherein n is 3 or 4; and at least about 90% of the fatty acid acyl groups are stearate, palmitate and/or oleate groups.

35. The container of claim 30 wherein the fatty acid acyl groups correspond to a fatty acid composition of a vegetable oil or fraction thereof.

36. The container of claim 30 wherein the fatty acid acyl groups correspond to a fatty acid composition of a hydrogenated vegetable oil or fraction thereof.

\* \* \* \* \*